United States Patent
Garrett et al.

(10) Patent No.: US 9,444,138 B2
(45) Date of Patent: Sep. 13, 2016

(54) LINK QUALITY TO STATIC AND NON-STATIC DEVICES

(71) Applicant: Broadcom Corporation, Irvine, CA (US)

(72) Inventors: David Garrett, Tustin, CA (US); Jun Zheng, San Diego, CA (US); Nihar Jindal, San Mateo, CA (US)

(73) Assignee: BROADCOM CORPORATION, Irvine, CA (US)

( * ) Notice: Subject to any disclaimer, the term of this patent is extended or adjusted under 35 U.S.C. 154(b) by 109 days.

(21) Appl. No.: 14/275,291

(22) Filed: May 12, 2014

(65) Prior Publication Data

US 2015/0236411 A1 Aug. 20, 2015

Related U.S. Application Data

(60) Provisional application No. 61/940,684, filed on Feb. 17, 2014.

(51) Int. Cl.
*H04B 7/00* (2006.01)
*H01Q 3/24* (2006.01)
*H04L 5/00* (2006.01)

(52) U.S. Cl.
CPC .............. *H01Q 3/24* (2013.01); *H04L 5/0048* (2013.01)

(58) Field of Classification Search
CPC .. H04W 16/28; H04W 24/02; H04W 88/085
USPC ................................. 370/310, 328, 339, 345
See application file for complete search history.

(56) References Cited

U.S. PATENT DOCUMENTS

| | | | | |
|---|---|---|---|---|
| 5,661,723 A * | 8/1997 | Ueno | ................ | H04L 49/105 370/315 |
| 7,221,318 B2 * | 5/2007 | Chang | ................ | H01Q 3/2605 342/372 |
| 7,366,247 B2 * | 4/2008 | Kim | ................ | H04B 7/063 375/267 |
| 7,545,791 B2 * | 6/2009 | Malik | ................ | H04L 5/06 370/328 |

(Continued)

FOREIGN PATENT DOCUMENTS

WO    WO-2012/117299       9/2012

OTHER PUBLICATIONS

European Search Report for EP Application No. 15000350 mailed Jul. 8, 2015.

(Continued)

*Primary Examiner* — Dmitry H Levitan
(74) *Attorney, Agent, or Firm* — Foley & Lardner LLP; Christopher J. McKenna; Daniel E. Rose

(57) ABSTRACT

In some aspects, the disclosure is directed to methods and systems for transmitting to static and non-static devices. An access point having a plurality of antennas can send a plurality of sounding frames from the plurality of antennas to a plurality of devices. The access point can identify, based on responses to the plurality of sounding frames, at least one static device from the plurality of devices. The access point can assign, based on the responses to the plurality of sounding frames, to each of the at least one static device, a corresponding one of the plurality of antennas for operation in a directional mode for transmissions to the corresponding static device, and the remaining antennas from the plurality of antennas for operation in an omnidirectional mode.

20 Claims, 5 Drawing Sheets

(56) References Cited

U.S. PATENT DOCUMENTS

| | | | | |
|---|---|---|---|---|
| 7,804,800 | B2* | 9/2010 | Li | H04B 7/0447 370/334 |
| 8,498,362 | B2* | 7/2013 | Zhang | H04B 7/0417 375/267 |
| 8,774,736 | B2* | 7/2014 | Choi | H04B 7/0602 370/334 |
| 9,094,071 | B2* | 7/2015 | Nandagopalan | H04B 7/0617 |
| 9,154,969 | B1* | 10/2015 | Srinivasa | H04W 24/00 |
| 2006/0073850 | A1* | 4/2006 | Cha | H04B 7/0608 455/562.1 |
| 2010/0111215 | A1 | 5/2010 | Nandagopalan et al. | |
| 2011/0274002 | A1* | 11/2011 | Pare, Jr. | H04B 7/0452 370/252 |
| 2013/0223427 | A1 | 8/2013 | Sohn et al. | |
| 2015/0010099 | A1* | 1/2015 | Lin | H04B 7/0404 375/267 |

OTHER PUBLICATIONS

IEEE Std 802.11ac™—2013 "IEEE Standard for Information technology—Telecommunications and information exchange between systems—Local and metropolitan area networks—Specific requirements: Part 11: Wireless LAN Medium Access Control (MAC) and Physical Layer (PHY) Specifications Amendment 4: Enhancements for Very High Throughput for Operation in Bands below 6 GHz" The Institute of Electrical and Electronics Engineers, Inc. 3 Park Avenue, New York, NY 10016-5997, USA.

IEEE Std 802.11n™—2009 "IEEE Standard for Information technology—Telecommunications and information exchange between systems—Local and metropolitan area networks—Specific requirements: Part 11: Wireless LAN Medium Access Control (MAC) and Physical Layer (PHY) Specifications Amendment 5: Enhancements for Very High Throughput" The Institute of Electrical and Electronics Engineers, Inc. 3 Park Avenue, New York, NY 10016-5997, USA.

* cited by examiner

LINK QUALITY TO STATIC AND NON-STATIC DEVICES

CROSS REFERENCE TO RELATED APPLICATIONS

This application claims the benefit of and priority to U.S. Provisional Application Ser. 61/940,684, filed Feb. 17, 2014, entitled "METHODS AND SYSTEMS FOR IMPROVING LINK QUALITY TO STATIC AND NON-STATIC DEVICES", assigned to the assignee of this application, and which is incorporated herein by reference in its entirety for all purposes.

FIELD OF THE DISCLOSURE

This disclosure generally relates to systems and methods for improving transmission links of a communications system. In particular, this disclosure relates to systems and methods for improving link quality to static and non-static devices.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for improving link quality to static and non-static devices.

A. Computing and Network Environment

Figure 1A:
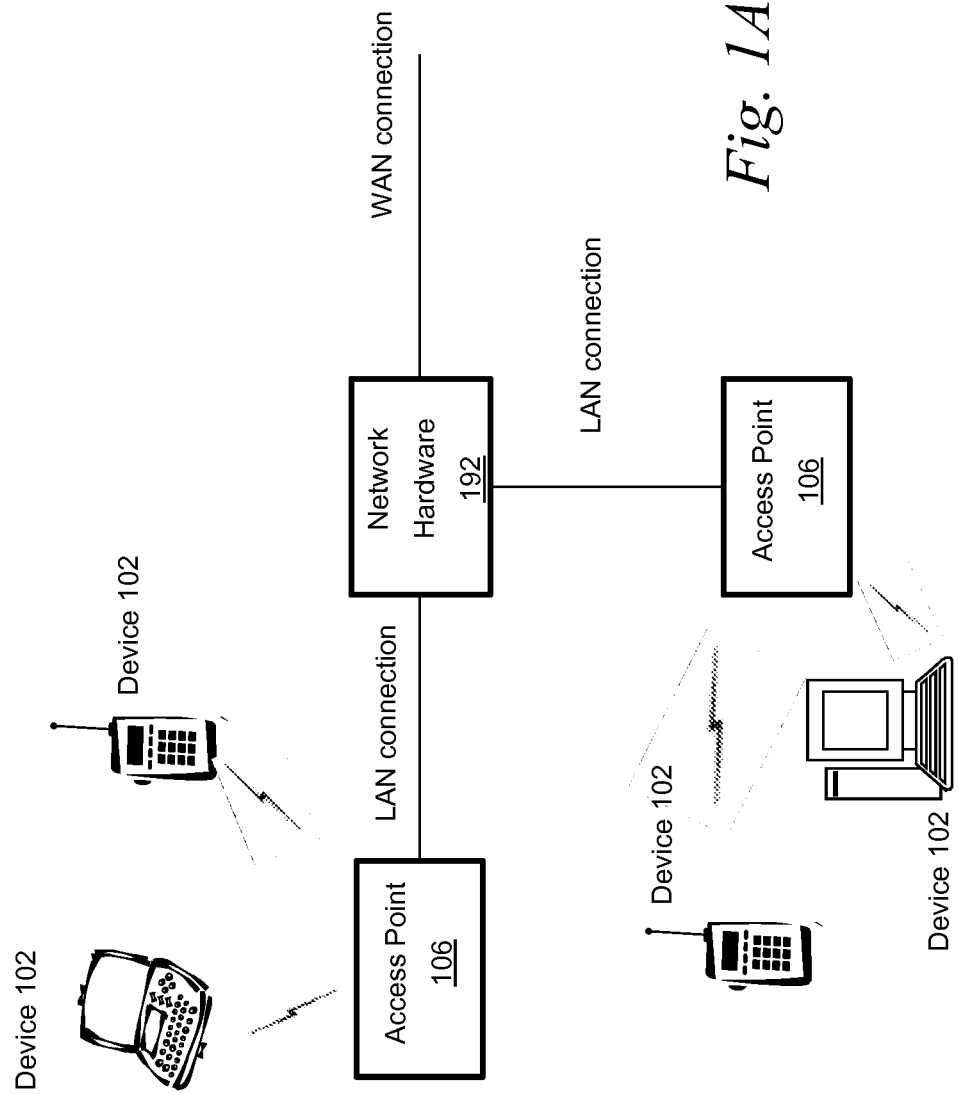
FIG. 1A is a block diagram depicting an embodiment of a network environment including one or more access points in communication with one or more devices or stations.

Prior to discussing specific embodiments of the present solution, it might be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or access point are described in greater detail with reference to FIGS. 1B and 1C. The network environment can be an ad hoc network environment, an infrastructure wireless network environment, a subnet environment, etc. in one embodiment The access points (APs) 106 can be operably coupled to the network hardware 192 via local area network connections. The network hardware 192, which can include a router, gateway, switch, bridge, modem, system controller, appliance, etc., can provide a local area network connection for the communication system. Each of the access points 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 can sometimes be referred to as an wireless access point (WAP). An access point 106 can be implemented, designed and/or built for operating in a wireless local area network (WLAN). An access point 106 can connect to a router (e.g., via a wired network) as a standalone device in some embodiments. In other embodiments, an access point can be a component of a router. An access point 106 can provide multiple devices 102 access to a network. An access point 106 can, for example, connect to a wired Ethernet connection and provide wireless connections using radio frequency links for other devices 102 to utilize that wired connection. An access point 106 can be built and/or implemented to support a standard for sending and receiving data using one or more radio frequencies. Those standards, and the frequencies they use can be defined by the IEEE (e.g., IEEE 802.11 standards). An access point can be implemented and/or used to support public Internet hotspots, and/or on an internal network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
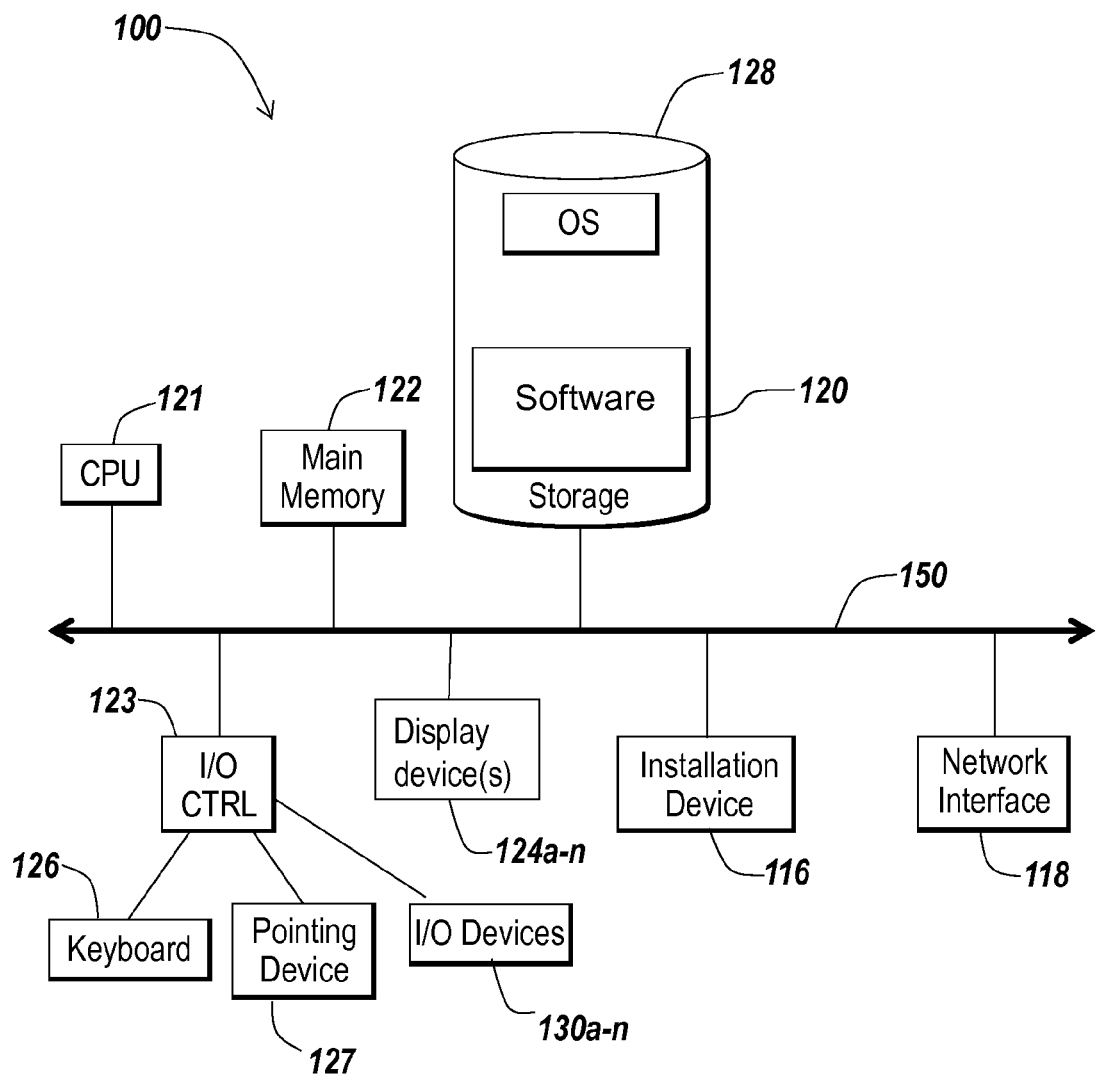
FIGS. 1B and 1C are block diagrams depicting embodiments of computing devices useful in connection with the methods and systems described herein.
Figure 1C:
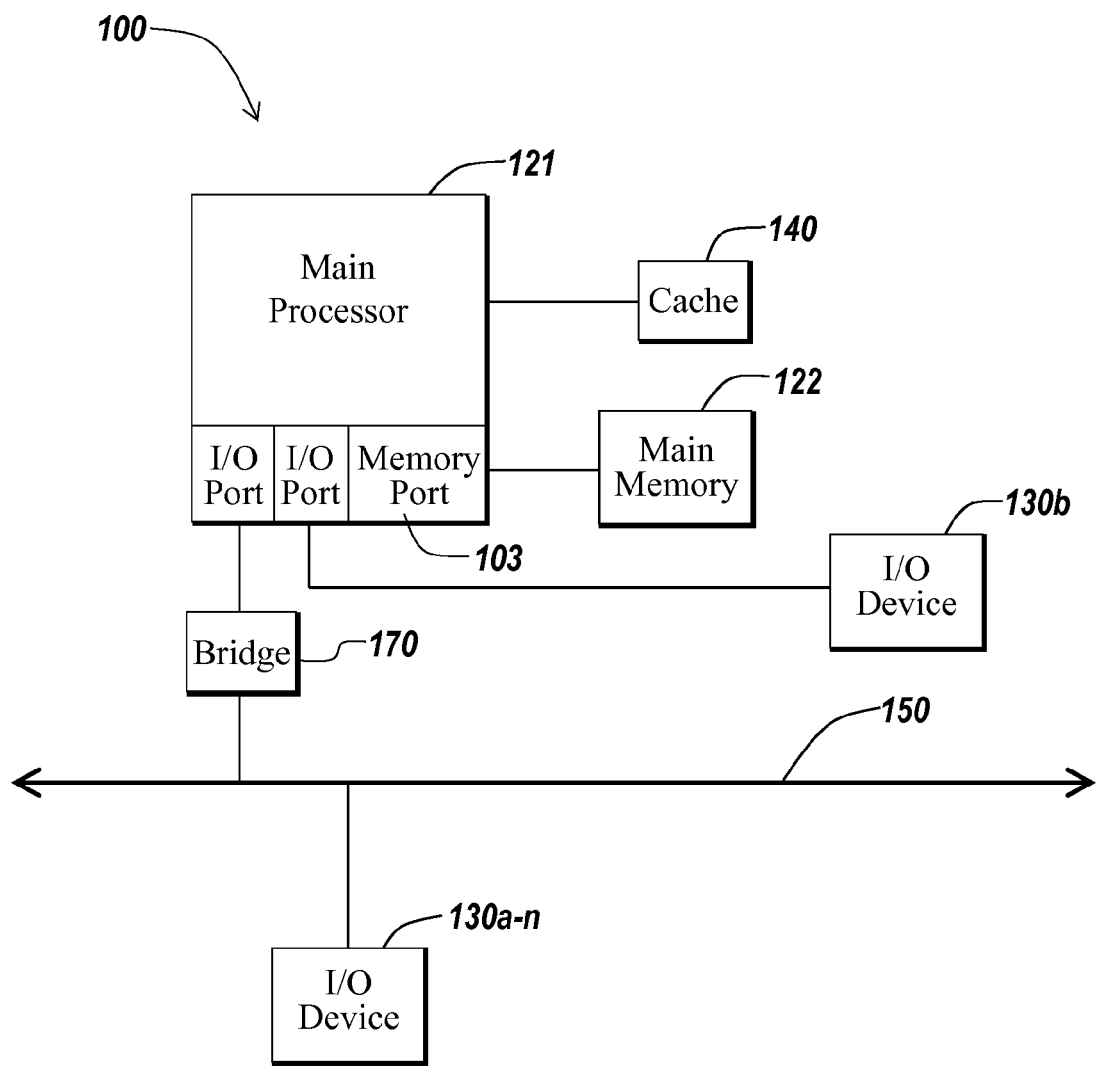

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the access point 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a Video Electronics Standards Association Local (VESA VL) bus, an Industry Standard Architecture (ISA) bus, an Extended ISA (EISA) bus, a MicroChannel Architecture (MCA) bus, a Peripheral Component Interconnect (PCI) bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, Personal Computer Memory Card International Association (PCMCIA) network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. One ordinarily skilled in the art will recognize and appreciate the various ways and embodiments that a computing device 100 can be implemented to have one or more display devices 124a-124n.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Improving Link Quality to Static and Non-Static Devices

Described herein are systems and methods for improving link quality to static and non-static devices 102. The use of omnidirectional antennas for transmission to all devices 102 (including static devices 102) can limit or reduce system efficiency (e.g., based on SNR and/or power requirements). In one embodiment, the link quality for a persistent multi-user multiple-input and multiple-output (MU-MIMO) link or channel, for example, can be improved by configuring one or more antennas to operate in a directional mode for the link or channel when it is static, known and/or predicted from an omnidirectional sounding. Dynamic switching of at least some of these directional antennas to an omnidirectional mode can provide additional coverage for non-static devices 102 in one embodiment.

In a MU-MIMO configuration with a plurality of devices, beamformees, users or stations (hereafter sometimes generally referred to as "devices" or "STAs") 102, a beamformer or access point (hereafter sometimes generally referred to as an "access point" or "AP") 106 can communicate with each of the plurality of devices 102. The AP 106 can include a number of antennas and a number of transmit chains which can be the same as or less than the number of antennas. In some cases, the AP 106 can determine that the devices 102 include one or more static devices 102, and can assign a subset of the plurality of antennas to operate in a directional mode with respect to the one or more static devices 102. In certain embodiments, for example when there are fewer transmit chains than the number of antennas, the AP 106 can be implemented to switch an antenna between an omnidirectional mode and a directional mode, for example on a time-division-multiplex basis, for coverage over known, static devices 102 and one or more mobile, non-static or new devices 102. Time-splitting between a directional and an omnidirectional mode can provide coverage over a known static device 102 and any other device which can be non-static or new.

The AP 106 can leverage and/or use sounding frames, such as null data packet (NDP) sounding frames, to determine an improved configuration 224 with directional mode transmissions to static device(s) 102 and omnidirectional mode transmissions to non-static device(s) 102. Sounding frames sent over an initial omnidirectional mode can help determine a desired configuration 224 for a directional mode of operation in one embodiment. For example, an omnidirectional mode can initially be used to discover a static AP 106 and identify a suitable configuration 224 for supporting a directional mode of operation. When considering multiple antennas, the AP 106 can provide soundings using different antenna selections to determine improved coupling of certain antennas to the static devices 102, and can allocate other antennas for omnidirectional operation that improves the overall nulling effect between antenna transmissions in one embodiment. Antenna-to-device couplings can be improved over a number of antennas and static devices 102 which can depend on the positions and/or orientations of the antennas and/or devices 102 in one embodiment. Antenna-to-device couplings can be dynamically updated based on changes (e.g., to devices 102 and/or device channels) in one embodiment. The effect of mode switching and/or antenna-device coupling can result in an overall improvement in coverage and link quality across devices 102 in one embodiment.

In one embodiment, the disclosure is directed to a method for transmitting to static and non-static devices 102. The method can include sending, by an access point having a plurality of antennas, a plurality of sounding frames from the plurality of antennas to a plurality of devices 102. The access point can identify, based on responses to the plurality of sounding frames, at least one static device 102 from the plurality of devices 102. The access point 106 can assign, based on the responses to the plurality of sounding frames, to each of the at least one static device 102, a corresponding one of the plurality of antennas for operation in a directional mode for transmissions to the corresponding static device 102. The access point can assign at least one of the remaining antennas from the plurality of antennas for operation in an omnidirectional mode.

In some embodiments, the access point can send the plurality of sounding frames from the plurality of antennas operating in an omnidirectional mode. The access point can determine, based on at least one of the responses to the plurality of sounding frames, assignments between the at least one static device 102 and some of the plurality of antennas for operation in a directional mode. The access point can use at least one of the remaining antennas operating in an omnidirectional mode, for transmissions to one or more non-static devices 102 from the plurality of devices 102. The access point can send, via the remaining antennas operating in an omnidirectional mode, a second plurality of sounding frames. The access point can re-assign at least one of the plurality of antennas operating in a directional mode, for transmissions to another of the plurality of devices 102. In certain embodiments, the access point can adjust, based on responses to the plurality of sounding frames, a rate for sending additional sounding frames. The access point can switch at least one antenna assigned to operate in a directional mode, to operate in an omnidirectional mode after a predefined period of time.

In some embodiments, the access point includes a first number of transmit chains. The plurality of antennas can include a second number of omnidirectional antennas for operation in the omnidirectional mode and a third number of directional antennas for operation in the directional mode. The sum of the second number and the third number can be larger than the first number. The access point can switch a first transmit chain of the transmit chains between a connection to a first directional antenna of the directional antennas and a connection to a first omnidirectional antenna of the omnidirectional antennas, according to a time division multiplexing scheme.

In another aspect, the disclosure is directed to a method for transmitting to static and non-static devices 102. The method can include sending, by an access point having a plurality of antennas, a plurality of sounding frames from the plurality of antennas to a plurality of devices 102. The access point can identify, based on responses to the plurality of sounding frames, a first static device 102 from the plurality of devices 102. The access point can assign, based on the identification, a first antenna of the plurality of antennas for operation in a directional mode with the first static device 102 for a first predefined period of time. The first antenna can be implemented to switch to an omnidirectional mode after the first predefined period of time.

In some embodiments, the access point can send the plurality of sounding frames from the plurality of antennas operating in an omnidirectional mode. The access point can adjust, based on responses to the plurality of sounding frames, a rate for sending additional sounding frames. The access point can assign a second antenna of the plurality of antennas to operate in an omnidirectional mode for transmissions to one or more non-static devices 102 from the plurality of devices 102. The access point can send, via the second antenna assigned to operate in the omnidirectional mode, at least one additional sounding frame. The access point can switch the first antenna between the directional mode and the omnidirectional mode, according to a time division multiplexing scheme.

In some embodiments, the access point includes a first number of transmit chains. The plurality of antennas can include a second number of omnidirectional antennas for operation in the omnidirectional mode and a third number of directional antennas for operation in the directional mode. The sum of the second number and the third number might be larger than the first number. The access point can switch a first transmit chain of the transmit chains between a connection to a first directional antenna of the directional antennas and a connection to a first omnidirectional antenna of the omnidirectional antennas, according to a time division multiplexing scheme.

In yet another aspect, the disclosure is directed to a method for transmitting to static and non-static devices 102. The method can include identifying, by an access point based on a response to a sounding frame from the access point, a first static device 102 from a plurality of devices 102. The access point can include a plurality of antennas and a first number of transmit chains. The plurality of antennas can include a second number of omnidirectional antennas for operation in an omnidirectional mode and a third number of directional antennas for operation in a directional mode. The sum of the second number and the third number can be larger than the first number. The access point can assign, based on the response, a first directional antenna of the directional antennas to the first static device 102 for operation in a directional mode via a connection with a first transmit chain of the transmit chains. The access point can switch, after a first predefined period of time, the first transmit chain from the connection with the first directional antenna, to a connection with a first omnidirectional antenna of the omnidirectional antennas.

In certain embodiments, the access point can send the sounding frame from one of a plurality of antennas of the access point operating in an omnidirectional mode. The access point can adjust, based on the response, a rate for sending additional sounding frames. The access point can switch the first transmit chain between the connection with the first directional antenna and the connection with the first omnidirectional antenna, according to a time division multiplexing scheme.

Figure 2A:
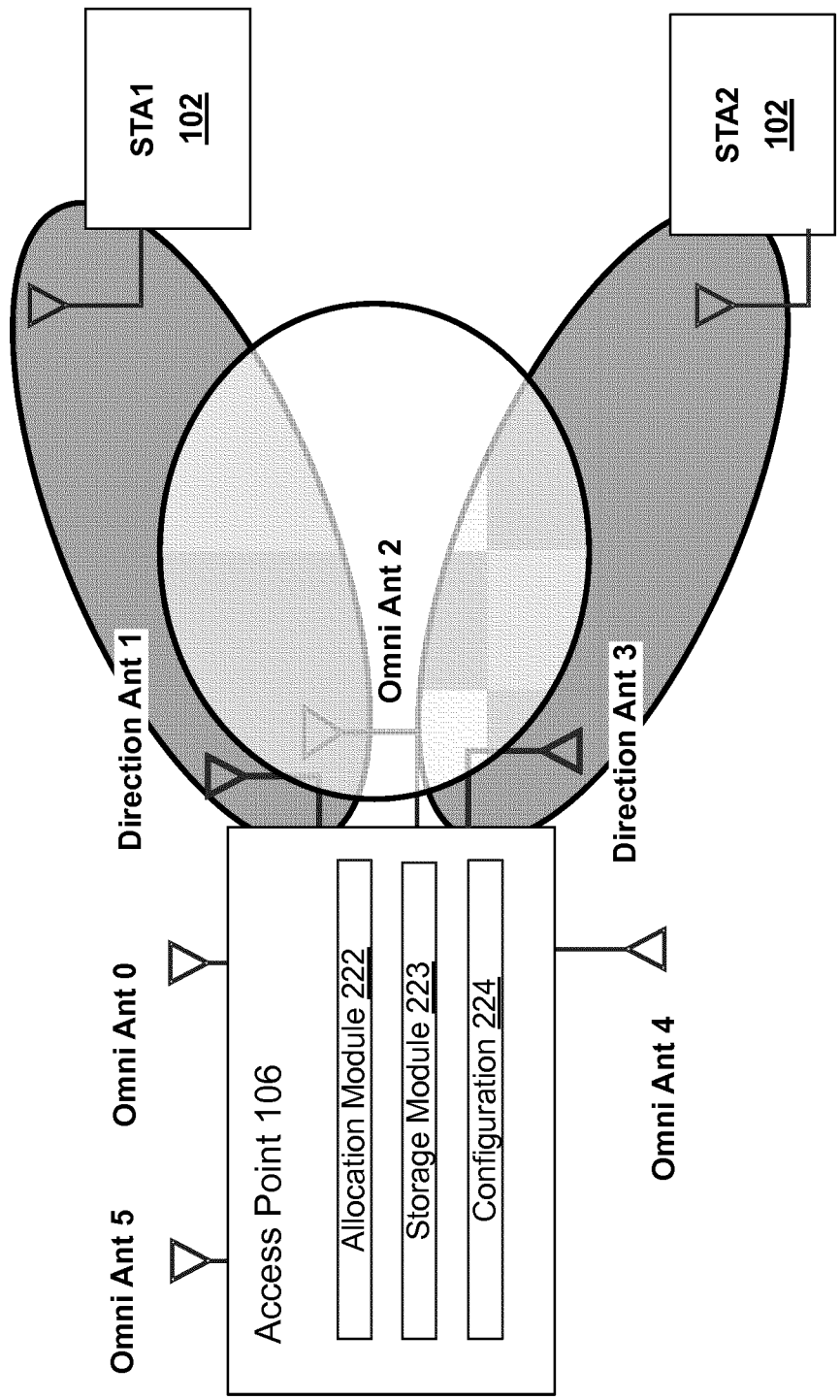
FIG. 2A is a block diagram depicting an embodiment of a system for transmitting to static and non-static devices.

Referring to FIG. 2A, an embodiment of a system for transmitting to static and non-static devices 102 is depicted. In brief overview, the system can include a beamformer or access point 106 having information to transmit to a number (e.g., 1 to N) of beamformees, devices or STAs 102. The AP 106 can include an allocation module 222, a storage module 223 and/or a configuration 224. The AP 106 and/or the devices 102 can each include a radio, and can include a transmitter and/or a receiver. The AP 106 can include a plurality of antennas (e.g., phase array antennas). The system can support a MU-MIMO transmission configuration 224 between the AP 106 and the plurality of devices 102 in one embodiment. The AP 106 can have varying amounts of information to transmit to each device 102, which can be relatively constant or variable over time, for example, based in part on whether the device 102 can be static or non-static in one embodiment.

The AP 106 can use sounding frames to identify static and/or non-static devices 102 in one embodiment. The AP 106 can use one or more sounding frames to detect devices 102 within a perimeter, vicinity or region of coverage of the AP 106 in one embodiment. The AP 106 can use capability exchange (e.g., during initial handshaking or link establishment) to determine devices 102 that support MU-MIMO, or the AP 106 can use one or more sounding frames and the corresponding feedback frames to detect devices 102 that support MU-MIMO communications and/or devices that do not in one embodiment. The AP 106 can use a plurality of sounding frames to determine if a device 102 is static or non-static (e.g., relative to the AP 106, in location, orientation and/or channel characteristics for instance). In one embodiment, a static device 102 can include a device 102 (i) that is stationary or substantially stationary, (ii) that has at least one antenna with a fixed or static orientation or which is substantially fixed or static (e.g., relative to the AP 106), (iii) that supports a persistent, known or predictable transmission link, and/or (iv) that supports a signal-to-noise ratio (SNR) that is constant or substantially constant with respect to an AP 106. For example, a static device 102 can include a desktop computer, a wireless-fidelity (WiFi) enabled television set, a wireless printer, a set top box, or an appliance. A static device 102 can include a device 102 that is known, predictable and/or persistent to the AP 106, e.g., having a same or similar set of characteristics (e.g., channel or link characteristics, traffic pattern/characteristics, location, orientation) with respect to the AP 106 in one embodiment. For example, a device 102 can be known or deterministic because the device 102 is known to operate in (e.g., switch to) a specific communications protocol supported by the AP 106, according to a time schedule or predictable cycle for instance.

In one embodiment, a non-static device 102 can include a device 102 that is not static, e.g., (i) that is non-stationary or substantially non-stationary, (ii) that has at least one antenna with a changing, changeable or non-static orientation or which is significantly so (e.g., relative to the AP 106), (iii) that supports (e.g., to a significant extent) a changing, changeable, non-persistent, unknown or unpredictable transmission link, and/or (iv) that supports a SNR that is non-constant or significantly non-constant with respect to the AP 106. For example, a non-static device 102 can include a mobile device 102 such as a tablet, cellphone or laptop computer. A non-static device 102 can include a device 102 that has unknown, unpredictable and/or non-persistent characteristics (e.g., channel or link characteristics, traffic pattern/characteristics, location, orientation) with respect to the AP 106. For example, a device 102 can be determined to be non-static because an AP's link to the device is known to be significantly affected (e.g., by other objects) over time in one embodiment. A non-static device 102 can include a device that is newly detected or sometimes detectable by the AP 106 in one embodiment.

The AP 106 can be implemented to detect one or more devices 102 using at least one antenna implemented to operate in an omnidirectional mode in one embodiment. The AP 106 can generate or produce one or more sounding frames from the at least one antenna, e.g., to elicit responses from device(s) 102 to the one or more sounding frames in one embodiment. The sounding frame(s) can include NDP sounding frame(s). The sounding frame(s) can include MU-MIMO frame(s) in one embodiment. The AP 106 can determine the number of devices 102 based at least on the responses in one embodiment. The AP 106 can determine the type of device(s) 102, for example static or non-static, based at least on the responses in one embodiment. For example, the AP 106 can determine that a first device 102 is static based on two responses from the first device 102 corresponding to two sounding frames sent over a period of time. The at least two responses can, for example, indicate the same or similar channel characteristics (e.g., SNR) over the period of time. The AP 106 can be implemented (e.g., designed and/or built) to configure one or more antennas (e.g., to operate in omnidirectional mode) to produce the sounding frames. Some or all of these operations can be performed by an allocation module 222 of the AP 106.

The allocation module 222 can include hardware, or a combination of hardware and software. For example, the allocation module 222 can include any application, program, library, script, task, service, process or any type and form of executable instructions executing on hardware of the access point 106. In one embodiment, the allocation module 222 includes a set of executable instructions executing on a core or processor of the AP 106. The allocation module 222 can include circuitry designed and/or constructed to perform any of the operations and functions described herein. In some embodiments, the allocation module 222 is implemented to control transmission of packets or frames to devices 102 via one or more antennas of the AP 106. For example, the allocation module 222 can be implemented to allocate, select or assign certain antennas to operate in an omnidirectional or directional mode, either for specific periods of time (e.g., to send NDP sounding frames), or persistently (e.g., with respect to a static device 102). The allocation module 222 can for example configure an antenna to operate in a directional mode by tuning the antenna (e.g., phase array antennas) in one or more direction(s).

In some embodiments, the allocation module 222 includes firmware executing on the AP hardware. The firmware can operate in a layer of a protocol stack of the access point (e.g., in an upper layer). In certain embodiments, the allocation module 222 operates in the media access layer (MAC) layer, e.g., residing between a layer of MAC and another layer (e.g., an upper layer) of MAC. In some embodiments, the AP 106 or allocation module 222 can configure one or more antennas to perform beamforming with a single directional antenna (e.g., a first directional antenna) and/or coherent transmission from multiple antennas (e.g., including omni-directional and/or directional antennas) that creates a link with a static device 102, STA1. In certain embodiments, the AP 106 or allocation module 222 can configure one or more antennas to perform beamforming with a single directional antenna (e.g., a second directional antenna) and/or coherent transmission from multiple antennas (e.g., including omni-directional and/or directional antennas), that beamforms to or creates a link with device 102, STA2, such that the signal does not significantly interfere with the first antenna's link to the static device 102 (e.g., beamforming that substantially produces a null pattern at the static device 102). For example, a first antenna beamformed to STA1 can form the main link to STA1, and a second antenna (e.g., omnidirectional antenna) can form a complementary or second link to STA1 (e.g., with suitable nulling and/or little interference with respect to the first antenna). The antennas used to beamform to STA2 can overlap with the antennas used to beamform to STA1. For instance, in some embodiments, a first antenna can be used to beamform to STA2, and can be used to beamform to STA1, e.g., at the same time. The AP 106 or allocation module 222 can implement or perform beamforming and/or steering over one or more antennas, for linking with two or more devices 102, and can allow sharing of one or more common antennas between the links to the two or more devices 102, in some embodiments. The AP 106 or allocation module 222 can implement or perform beamforming and/or steering over one or more antennas, to provide appropriate or effective nulling between two or more devices 102, in certain embodiments. The decision to form any of the above configurations can be based on one or more responses of sounding frames.

The allocation module 222 can be implemented (e.g., built or designed) to allocate, assign and/or configure certain antenna(s) of the AP 106 to operate in a certain mode (e.g., omnidirectional or directional mode). The allocation module 222 can determine, based at least on responses to sounding frames, to assign one or more antennas to operate in a directional mode with a static device 102. For example, the allocation module 222 can determine that a specific antenna provides an improved coupling with the static device 102, e.g., via the position and/or orientation of the antenna. The allocation module 222 can determine an improved coupling across multiple antennas and static devices 102, e.g., based on overall SNR and/or channel capacity, even though a particular antenna-device coupling did not improve.

The allocation module 222 can use soundings based on different antenna selections to determine improved coupling of certain antennas to static devices 102 in one embodiment. The allocation module 222 can use soundings based on different antenna selections to determine antennas for omnidirectional operation in one embodiment. The allocation module 222 can determine an antenna configuration 224 that improves the overall nulling effect between antenna transmissions. The allocation module 222 can improve antenna-to-device couplings over a plurality of antennas and static devices 102, based at least on the positions and/or orientations of the antennas and/or devices 102 in one embodiment. The allocation module 222 can dynamically update an antenna-to-device coupling (e.g., based on a change associated with a static device 102, for example detected based on a response to a sounding frame) in one embodiment. The allocation module 222 can switch the mode of operation on an antenna, e.g., between directional and omnidirectional modes in one embodiment. The use of mode switching and/or antenna-device coupling can result in an overall improvement of coverage and/or link quality across devices 102.

Referring again to FIG. 2A, for example, the AP 106 can use antennas Ant1 and Ant3 for directional transmissions to STAT and STA2 (devices 102), respectively. The AP 106 can use antenna Ant2 as an additional "nulling" degree of freedom, e.g., based on its orientation and/or physical position relative to antennas Ant1 and Ant3. For example, transmissions from antenna Ant2 might not appear at (or be coupled to) STA1 and STA2, due to transmission nulling via beamforming. Static devices STA1 and STA2 102 can benefit from improved link quality using directional coupling to antennas Ant1 and Ant3, and/or nulling effect from antenna Ant2. Non-static devices 102 can receive transmissions via antenna Ant2 operating in omnidirectional mode in one embodiment. Non-static devices 102 can benefit from improved link quality with antenna Ant2 based on directional interference or transmission nulling by antennas Ant1 and/or Ant3.

In some embodiments, the AP 106 includes one or more transmit (or transmission) chains. A transmit chain can include one or more components or modules such as a filter (e.g., low-pass and/or band-pass filter(s)), an amplifier, a digital-to-analog converter, and a modulator. An AP 106 can include a number of transmit chains that is equal to a number of physical antennas of the AP 106 in one embodiment. The AP 106 can perform full channel steering across the antennas, e.g., Ant0-7. In certain embodiments, the AP 106 can include a number of transmit chains relative to a number (e.g., 0 to N) of the antennas Ant0-7, with enough spatial degrees of freedom to assign or dedicate some of these antennas for operation in a directional mode with one or more static devices 102. In some embodiments, the AP 106 can include a number of transmit chains to assign or dedicate some of these antennas for operation in a directional mode with one or more static devices 102 without switching modes. For example, in an AP 106 with eight transmit chains and eight antennas, the AP 106 can have enough degrees of freedom relative to two detected static devices 102, to connect two of the transmit chains each to one of the antennas, each of the antennas for persistent operation in a directional mode with respect to a corresponding static device 102 in one embodiment.

In some embodiments, the number of available antennas in an AP 106 can have more than the number of available transmit chains. For example, an AP 106 can include four transmit chains and eight physical antennas. In certain embodiments, an AP 106 can have a specific number of omnidirectional antennas and/or a specific number of directional antennas available to the AP 106. For example, one or more antennas can be pre-configured and/or built to operate as directional or omnidirectional antenna. The allocation module 222 can identify the type of each antenna, and can assign a directional antenna for connection to a transmit chain and/or for transmissions to a static device 102. The allocation module 222 can determine to connect some or all of the transmit chains to a corresponding number of antennas for transmissions to device(s) 102. The allocation module 222 can determine and/or specify one or more periods of time during which to maintain the connections and/or perform the transmissions. In some embodiments, the AP 106 might not have enough spatial degrees of freedom to persistently dedicate some of the transmit chains and antennas for directional mode operation with static device(s) 102. For example, the number of antennas connected to transmit chains might not provide enough degrees of freedom to separate transmission patterns to different devices 102 and/or create nulls between transmissions to different devices 102. In some of these cases, the allocation module 222 can determine to switch modes of operation of an antenna and/or connect (or reconnect) a transmit chain to a different antenna.

The allocation module 222 can have access to a configuration 224 of the access point 106. The configuration 224 can include information about assignment or allocation of antennas, e.g., to operate omni-directionally, or directionally to one or more of the plurality of devices 102. The configuration 224 can include information about connecting or coupling a specific antenna to a particular transmit chain. The configuration 224 can include information about the number of omnidirectional antenna(s) and/or the number of directional antenna(s) available to an AP 106. The configuration 224 can include information about transmit chains available to the AP 106. The configuration 224 can include a schedule or timing information for configuring or re-configuring antennas (e.g., switching modes of operation, connection to a particular transmit chain). The configuration 224 can include information on sending a sounding frame, for example, specify intervals between sounding frames.

The configuration 224 can be stored in a storage module 223 of the access point 106. The storage module 223 can include one or more interconnected storage devices, such as any embodiment of storage devices 128, 140, 122, described above in connection with FIGS. 1B and 1C. In some embodiments, the allocation module 222 can generate the configuration 224, for example, by generating antenna assignment(s), e.g., mode of operation and/or transmit chain connection. The allocation module 222 can generate an initial configuration 224 (e.g., an initial assignment of antennas and/or transmit chains), and can store the initial configuration 224 in the storage module 223. The allocation module 222 can, for example, connect each available transmit chain to an antennas for initial operation in an omnidirectional mode.

In some embodiments, the configuration 224 specifies and/or configures an allocation of transmission resources (e.g., antenna assignments) for at least some of the plurality of devices 102. The configuration 224 can include a list, table or other database structure, and can include at least one entry, record or specification for each device 102. The configuration 224 can include (e.g., be specified and/or defined in) a file or a collection of records, stored/maintained in the storage module 223 (e.g., memory). A transmitter or transmit chain of the access point 106 can access or read a portion of the configuration 224, to establish a connection to an antenna and/or configure the antenna for transmissions. For example, the transmitter or transmit chain can hash into the configuration 224 for a certain antenna or device 102, to allocate and/or configure transmission resources. The allocation module 222 can update the configuration 224 based on feedback or updates included in a response to a sounding frame.

Figure 2B:
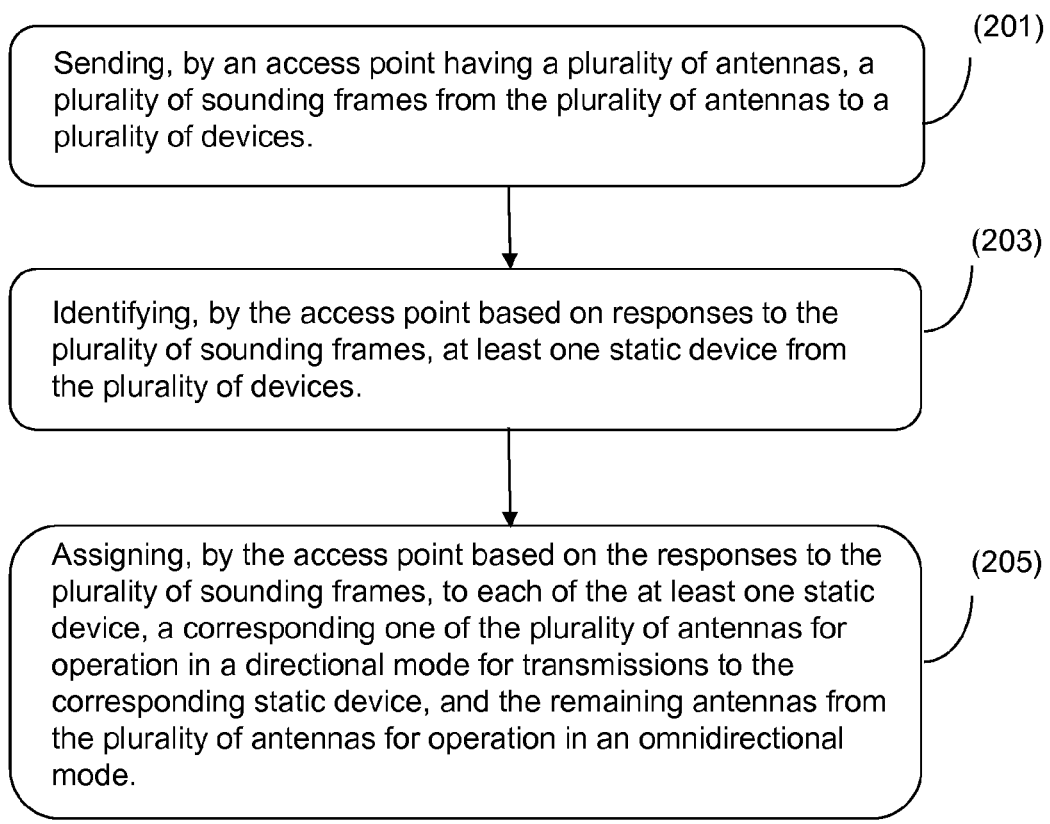
FIG. 2B is a flow diagram of an embodiment of a method for transmitting to static and non-static devices.

Referring now to FIG. 2B, one embodiment of a method for transmitting to static and non-static devices 102 is depicted. The method can include sending, by an access point having a plurality of antennas, a plurality of sounding frames from the plurality of antennas to a plurality of devices 102, (operation 201). The access point 106 can identify, based on responses to the plurality of sounding frames, at least one static device 102 from the plurality of devices 102 (operation 203). The access point 106 can assign, based on the responses to the plurality of sounding frames, to each of the at least one static device 102, a corresponding one of the plurality of antennas for operation in a directional mode for transmissions to the corresponding static device 102, (operation 205). The access point 106 can assign at least one of the remaining antennas from the plurality of antennas for operation in an omnidirectional mode.

Referring now to operation 201, and in some embodiments, an access point 106 having a plurality of antennas can send a plurality of sounding frames from the plurality of antennas to a plurality of devices 102. The AP 106 can send one or more sounding frames from one or more antennas of the AP 106 in one embodiment. The AP 106 can send sounding frames via different selections of antennas in one embodiment. The AP 106 can send a sounding frame including a MU-MIMO frame and/or an NDP frame in one embodiment. The AP 106 can send the plurality of sounding frames from one or more of the plurality of antennas operating in an omnidirectional mode in one embodiment. The allocation module 222 of the AP 106 can configure one or more antennas to send the sounding frame(s). The allocation module 222 can configure an antenna to operate in an omnidirectional mode, a directional mode, or to switch or transition between these two modes, for example at a certain time or according to a schedule or configuration 224. For example, the allocation module 222 can initially configure an antenna to operate in an omnidirectional mode when sending a sounding frame. The AP 106 can send the sounding frames to identify static and/or non-static devices 102. The AP 106 can send the plurality of sounding frames to determine if a device 102 is static or non-static, e.g., relative to the AP 106.

The AP 106 can generate or send a sounding frame to elicit or request for responses from devices 102 in the vicinity of the AP 106. The AP 106 can send one or more sounding frames to detect devices 102 within a perimeter, vicinity or region of coverage of the AP 106. The AP 106 can send the one or more sounding frames to detect devices 102 that support MU-MIMO communications and/or devices that do not. The AP 106 can send one or more sounding frames to detect a new or unknown device, and/or if a previously detected device 102 is still present and/or has an attribute (e.g., location) that has changed. The AP 106 can send one or more sets of one or more sounding frames each. Multiple sets of the one or more sounding frames can be sent over a period of time (e.g., at specified time instances). The AP 106 can send one or more sounding frames, in response to one or more responses received for at least one previous sounding frame sent by the AP 106. The AP 106 can send the one or more sounding frames based on configuration 224 of the AP 106. The allocation module 222 can determine to schedule and/or send a next set of one or more sounding frames, dynamically or otherwise, based at least on a response to a previous sounding frame.

In some embodiments, the access point 106 configures (e.g., via the allocation module 222) one or more transmit chains of the AP 106. The AP 106 can include a first number of transmit chains (e.g., available or operable transmit chains), and a plurality of antennas (e.g., available or operable antennas) including a second number of omnidirectional antennas for operation in the omnidirectional mode and a third number of directional antennas for operation in the directional mode. The sum of the second number and the third number can be greater than the first number. In certain embodiments, the sum of the second number and the third number can be equal to the first number. The allocation module 222 can configure a transmit chain to connect with an antenna to produce a sounding frame. The allocation module 222 can assign and/or reconfigure specific transmit chain(s) to connect with particular antenna(s) at various time instances (e.g., based on a configuration 224). For example, where there are fewer transmit chains than the number of available antennas, at least some of the transmit chains can be switched between some of the available antennas (e.g., to operate in different modes, and/or to communicate with different devices 102).

Referring now to operation 203, and in some embodiments, the access point 106 can identify, based on responses to the plurality of sounding frames, at least one static device 102 from the plurality of devices 102. The AP 106 can receive one or more responses from one or more devices 102 to the plurality of sounding frames. The AP 106 can parse a response for information associated with a corresponding device 102 and/or channel. By way of illustration and not intended to be limiting in any way, an AP 106 can parse a response for one or more of a device identifier, SNR information, and channel estimation information. The AP 106 can track, monitor and/or compare information obtained from various devices 102 over time (e.g., over multiple responses). The AP 106 can track, monitor and/or compare information obtained from a device 102 corresponding to particular selections of antennas and their sounding frames. For example, the AP 106 can store some of this information in a storage module 223 of the AP 106. In some embodiments, the AP 106 can request for additional response(s), for example, by sending additional sounding frame(s). The AP 106 can request for additional response(s) based at least on information from a previous response. The AP 106 can adjust a frequency or rate for sending additional sounding frames, and/or a time instance for a next sounding frame, based at least on information from one or more previous responses.

The AP 106 can identify one or more static and/or non-static devices 102 based at least on one or more responses to the sounding frames. The AP 106 can identify one or more static and/or non-static devices 102 based on a comparison of information obtained from the one or more responses. The AP 106 can determine, based on the at least one response, if a device 102 is static or non-static. The AP 106 can compare one or more channel characteristics with respect to a device 102, for example provided via responses sent by the device 102 at different times (e.g., in response to different sounding frames). The AP 106 can determine that a device 102 is static or non-static based on any detected change in channel characteristics. The AP 106 can determine that a device 102 is static or non-static, for example based on any of the factors or characteristics discussed above in connection with at least FIG. 2A.

In some cases or scenarios, an AP 106 can determine that a device 102 is a new device (e.g., not previously detected, or did not previously respond to a sounding frame). The AP 106 can determine that a new device 102 is a non-static device 102. The AP 106 can determine that a device 102 is a known and/or persistent device, e.g., having known or predictable traffic patterns and/or channel characteristics. The AP 106 can determine that a known and/or persistent device is a static device 102. The AP 106 can determine that one or more devices 102 are no longer present or detectable (e.g., powered down, or not communicating with the AP 106). The AP 106 can track the number of static and/or non-static devices 102. The AP 106 can estimate or determine a location and/or orientation of a static device 102 relative to the AP 106 (e.g., for configuring an antenna for transmissions to the static device 102). The AP 106 can determine, estimate or predict the number of non-static devices 102, e.g., for configuring one or more antennas to operate in an omnidirectional mode.

Referring now to operation 205, and in some embodiments, the access point 106 can assign, based on the responses to the plurality of sounding frames, to each of the at least one static devices 102, a corresponding one of the plurality of antennas for operation in a directional mode for transmission to the corresponding static device 102. The access point can assign at least one of the remaining antennas from the plurality of antennas for operation in an omnidirectional mode. An allocation module 222 can allocate, assign and/or configure certain antenna(s) of the AP 106 to operate in a certain mode (e.g., omnidirectional or directional mode). The AP 106 can determine, based on the responses to the plurality of sounding frames, assignments between the at least one static device 102 and some of the plurality of antennas for operation in a directional mode. An allocation module 222 can determine, based at least on the responses, to assign one or more antennas to operate in a directional mode with a static device 102. For example, the allocation module 222 can assign, based at least on a response, a first directional antenna of the AP's directional antennas, to a first static device 102 for operation in a directional mode via a connection with a first transmit chain of the AP's transmit chains.

The AP 106 can assign one or more antennas to communicate with a device 102, based on a determination that the device 102 is a static device 102. For example, a first antenna can establish a first channel or connection with the device 102, and a second antenna can establish a second channel or connection with the device 102. The AP 106 or allocation module 222 can configure a first antenna to perform beamforming to establish a link with a static device 102. The AP 106 or allocation module 222 can configure a first antenna that is initially or originally configured as an omnidirectional antenna (e.g., for sounding purposes), to operate in a directional mode with a static device 102. The AP 106 or allocation module 222 can configure a second antenna to perform beamforming (e.g., omnidirectional or directional beamforming) that does not significantly interfere with the first's antenna's link to the static device 102. The AP 106 or allocation module 222 can configure a second antenna to perform beamforming that substantially produces a null pattern at the static device 102. The transmission nulling can improve the link quality of the static device 102 in one embodiment. The AP 106 or allocation module 222 can configure a second antenna to create transmission nulling with respect to the static device 102, e.g., to improve the link quality between the first antenna and the static device 102 in one embodiment. The radiation pattern (or "beam") of the first antenna can be shaped or implemented to create transmission nulling or interference that can benefit a non-static device 102, e.g., improve the link quality between the non-static device 102 and the second antenna.

By way of illustration, the allocation module 222 can determine that a first antenna provides an improved coupling with the static device 102, e.g., based on the position and/or orientation of the antenna. The allocation module 222 can determine improved or suitable couplings across multiple antennas and static devices 102, e.g., based on overall SNR and/or channel capacity, even though specific antenna-device couplings did not improve.

The allocation module 222 can determine improved coupling of certain antennas to static devices 102, using soundings based on different antenna selections. The allocation module 222 can analyze sounding responses based on different antenna selections to determine antennas for omnidirectional and/or directional operation. The allocation module 222 can identify or determine an antenna configuration 224 that improves the overall nulling effect between antenna transmissions. The allocation module 222 can improve antenna-to-device couplings over a plurality of antennas and static devices 102, based at least on the positions and/or orientations of the antennas and/or the static devices 102. The allocation module 222 can dynamically update or change an antenna-to-device coupling (e.g., based on a change associated with a static device 102, for example detected based on a response to a sounding frame). The allocation module 222 can change or switch a mode of operation of antenna (e.g., between directional and omnidirectional modes), for example to improve coverage and/or link quality across devices 102.

In some embodiments, the AP 106 or allocation module 222 configures one or more antennas that are not assigned to static devices 102, to operate in an omnidirectional mode. The AP 106 can assign and/or configure at least some of the remaining antennas to operate in an omnidirectional mode for transmissions to one or more non-static devices 102 from the plurality of devices 102. For example, the allocation module 222 can assign a second antenna of the plurality of antennas to operate in an omnidirectional mode for transmissions to one or more non-static devices 102 from the plurality of devices 102. The AP 106 can use the omnidirectional antenna(s) to communicate (e.g., opportunistically) with non-static devices 102 (e.g., including new device(s) 102), if any. Opportunistic communication can include an attempt to use sounding frames to connect with devices 102 that the AP 106 can have insufficient or no knowledge of, or which the AP 106 might not expect to be present for communications. In certain embodiments, the allocation module 222 configures the remaining antennas to operate in an omnidirectional mode. The allocation module 222 can configure one of the remaining antennas to operate in an omnidirectional mode and to transmit concurrent with transmission(s) from directional mode antenna(s). The allocation module 222 can configure one of the remaining antennas to operate in an omnidirectional mode and to transmit at a time that is staggered with respect to transmission(s) from directional mode antenna(s).

In some embodiments, the AP 106 sends, via one or more of the remaining antennas operating in an omnidirectional mode, at least one additional sounding frame (e.g., additional to one or more sounding frames already sent by the AP 106). For example, the AP 106 can send, via the second antenna assigned to operate in the omnidirectional mode, at least one additional sounding frame. The AP 106 can send, via one or more antennas operating in a directional mode, a plurality of sounding frames. In certain embodiments, for example when the number of antennas and/or transmit chains support enough spatial degrees of freedom to persistently assign one or more antennas to operate in a directional mode with one or more static devices 102, the allocation module 222 might not switch the mode of operation on a particular antenna. Where there are insufficient degrees of freedom (e.g., to adequately produce transmission nulls between antennas), the allocation module 222 can switch the mode of a particular antenna. In certain embodiments, for example to extend coverage over devices 102 and/or to address insufficient degrees of freedom, an allocation module 222 can switch operation of a plurality of antennas, from a first mode (e.g., directional mode) to a second mode (e.g., omnidirectional mode).

The allocation module 222 can re-assign or reconfigure at least one of the plurality of antennas for operation in a different mode, and/or for transmission to a different device 102. For example, the AP 106 can switch at least one antenna assigned to operate in a directional mode, to operate in an omnidirectional mode after a predefined period of time. Based on the identification of a first device 102 as a static device 102 for example, the AP 106 can assign a first antenna of the plurality of antennas for operation in a directional mode with the first device 102 for a first predefined period of time. The first antenna can be implemented to switch to an omnidirectional mode after the first predefined period of time. The first antenna can be implemented to switch between modes according to a schedule or based on certain events. An AP 106 can switch or modify transmit chain connections to one or more antennas, for example, in embodiments where the AP 106 include a number of transmit chains that is less than a number of antennas of the AP 106. In some cases, the allocation module 222 can determine to switch modes of operation of an antenna and/or to connect (or reconnect) a transmit chain to a different antenna.

In some embodiments, the AP 106 can include certain antennas that are pre-configured and/or built to be directional or omnidirectional antennas. For example, the AP 106 can include or incorporate a first number of directional antennas and a second number of omnidirectional antennas. The AP 106 can switch a first transmit chain from a connection with a first directional antenna, to a connection with a first omnidirectional antenna of the omnidirectional antennas. The AP 106 can switch, after a first predefined period of time, the first transmit chain from a connection with the first directional antenna, to a connection with a first omnidirectional antenna of the omnidirectional antennas. The AP 106 can switch this transmit chain or another transmit chain from a connection with a directional antenna, to a connection with an omnidirectional antenna. In some embodiments, the AP 106 switches an antenna between a directional mode and an omnidirectional mode according to a time division multiplexing scheme. The allocation module 222 can switch a first transmit chain of the AP's transmit chains between a connection to a first directional antenna of the directional antennas, and a connection to a first omnidirectional antenna of the omnidirectional antennas, according to a time division multiplexing scheme.

In some embodiments, depending on a context of operation of an access point 106 and/or a device 102, the device 102 can operate as an access point, and the access point 106 can operate as the device 102 for instance. Accordingly, references to access point(s) and/or device(s) in this disclosure are not limited to particular embodiments of an access point 106 and/or device 102. Operations 201, 203, and 205, for example, can be performed by beamformers, such as, wireless devices 102 (e.g., STAs) in one embodiment. Some devices 102 can communicate with each other (e.g., with another wireless device 102), or with an access point 106 using the devices' antennas operating in one or more specific modes. For example, devices 102 capable of multi-unit communication can include allocation module 222, storage module 223, and configuration 224, for example discussed in FIG. 2A, to effect antenna assignment and/or switching of antenna directional/omnidirectional mode as described herein according to some embodiments.

Although the disclosure might reference one or more "users", such "users" can refer to user-associated devices or stations (STAs), for example, consistent with the terms "user" and "multi-user" typically used in the context of a MU-MIMO environment.

Although examples of communications systems described above can include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for transmitting to static and non-static devices, the method comprising:
    sending, by an access point having a plurality of antennas, a first sounding frame and a second sounding frame from the plurality of antennas to a plurality of devices;
    receiving, by the access point at a first time, a first response to the first sounding frame from a first device;
    receiving, by the access point at a second, different time, a second response to the second sounding frame from the first device;
    detecting, by the access point, a change between channel characteristics of the first response and channel characteristics of the second response;
    identifying, by the access point, the first device as static responsive to the detected change between channel characteristics of the first response and channel characteristics of the second response; and
    configuring, by the access point responsive to the identification of the first device as static, to beamform to the first device using one or both of (i) one of the plurality of antennas for operation in a directional mode for transmission to the first device, or (ii) multiple antennas of the plurality of antennas for coherent transmission to the first device.

2. The method of claim 1, wherein sending the first sounding frame and second sounding frame further comprises sending the first sounding frame and second sounding frame from the plurality of antennas operating in an omnidirectional mode.

3. The method of claim 1, wherein configuring to beamform to the first device further comprises determining an assignment of the first device to some of the plurality of antennas for operation in a directional mode.

4. The method of claim 1, wherein configuring to beamform to the first device further comprises using the at least one of the plurality of antennas operating in an omnidirectional mode for transmissions to a second device from the plurality of devices.

5. The method of claim 1, wherein configuring to beamform to the first device further further comprises sending, via the at least one of the plurality of antennas operating in an omnidirectional mode, at least one additional sounding frame.

6. The method of claim 1, further comprising employing an antenna of the plurality of antennas being used to beamform to the first device, to beamform to a second device of the plurality of devices, the second device identified as static responsive to detection, by the access point, a change between channel characteristics of subsequent responses to sounding frames by the second device.

7. The method of claim 1, further comprising adjusting, based on responses to the first and the second sounding frames, a rate for sending additional sounding frames.

8. The method of claim 1, further comprising:
    switching, by the access point, at least one antenna configured to operate in a directional mode, to operate in an omnidirectional mode after a predefined period of time.

9. The method of claim 1, wherein the access point includes a first number of amplifiers, and the plurality of antennas comprise a second number of omnidirectional antennas for operation in the omnidirectional mode and a third number of directional antennas for operation in the directional mode, the sum of the second number and the third number being greater than the first number, the method further comprising:

switching, by the access point, a first amplifier between a connection to a first directional antenna of the directional antennas and a connection to a first omnidirectional antenna of the omnidirectional antennas, according to a time division multiplexing scheme.

10. A method for transmitting to static and non-static devices, the method comprising:

sending, by an access point having a plurality of antennas, a first sounding frame and a second sounding frame from the plurality of antennas to a plurality of devices;

receiving, by the access point at a first time, a first response to the first sounding frame from a first device;

receiving, by the access point at a second, different time, a second response to the second sounding frame from the first device;

detecting, by the access point, a change between channel characteristics of the first response and channel characteristics of the second response;

identifying, by the access point, the first device as static responsive to the detected change between channel characteristics of the first response and channel characteristics of the second response; and configuring, by the access point responsive to the identification of the first device as static, to beamform to the first device, using one or both of (i) one of the plurality of antennas for operation in a directional mode for transmission to the first static device, or (ii) multiple antennas of the plurality of antennas for coherent transmission to the first static device, wherein a first antenna configured for operation in a directional mode is configured to switch to an omnidirectional mode after a first predefined period of time.

11. The method of claim 10, wherein sending the first sounding frame and second sounding frame further comprises sending the first sounding frame and second sounding frame from the plurality of antennas operating in an omnidirectional mode.

12. The method of claim 10, further comprising adjusting, based on responses to the first and the second sounding frames, a rate for sending additional sounding frames.

13. The method of claim 10, further comprising assigning a second antenna of the plurality of antennas to operate in an omnidirectional mode for transmission to a second device from the plurality of devices.

14. The method of claim 10, further comprising sending, via an antenna of the plurality of antennas configured to operate in the omnidirectional mode, at least one additional sounding frame.

15. The method of claim 10, wherein configuring to beamform to the first device further comprises switching, by the access point, the first antenna between the directional mode and the omnidirectional mode, according to a time division multiplexing scheme.

16. The method of claim 10, wherein the access point includes a first number of amplifiers, and the plurality of antennas comprise a second number of omnidirectional antennas for operation in the omnidirectional mode and a third number of directional antennas for operation in the directional mode, the sum of the second number and the third number being greater than the first number, the method further comprising:

switching, by the access point, a first amplifier between a connection to a first directional antenna of the directional antennas and a connection to a first omnidirectional antenna of the omnidirectional antennas, according to a time division multiplexing scheme.

17. A method for transmitting to static and non-static devices, the method comprising:

identifying, by an access point, a first device as static responsive to detection of a change between channel characteristics of a first response transmitted by the first device to a first sounding frame from the access point and channel characteristics of a second response transmitted by the first device to a second sounding frame from the access point, wherein the access point includes a plurality of antennas and a first number of amplifiers, the plurality of antennas comprising a second number of omnidirectional antennas for operation in an omnidirectional mode and a third number of directional antennas for operation in a directional mode, the sum of the second number and the third number being greater than the first number;

configuring, by the access point based on the identification of the first device as static, a first directional antenna of the directional antennas to transmit to the first device for operation in a directional mode via a connection with a first amplifier, and switching, by the access point after a first predefined period of time, the first amplifier from the connection with the first directional antenna, to a connection with a first omnidirectional antenna of the omnidirectional antennas.

18. The method of claim 17, wherein identifying the first device as static further comprises sending the first sounding frame and second sounding frame from one of a plurality of antennas of the access point operating in an omnidirectional mode.

19. The method of claim 17, further comprising adjusting, based on the first response and second response, a rate for sending additional sounding frames.

20. The method of claim 17, wherein switching the first amplifier from the connection with the first directional antenna further comprises switching the first amplifier between the connection with the first directional antenna and the connection with the first omnidirectional antenna according to a time division multiplexing scheme.

* * * * *